United States Patent
Seo et al.

(10) Patent No.: US 10,582,553 B2
(45) Date of Patent: Mar. 3, 2020

(54) METHOD FOR TRANSMITTING OR RECEIVING D2D SIGNALS USING A SINGLE FREQUENCY NETWORK SCHEME IN WIRELESS COMMUNICATION SYSTEM, AND APPARATUS FOR SAME

(71) Applicant: LG ELECTRONICS INC., Seoul (KR)

(72) Inventors: Inkwon Seo, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/578,866

(22) PCT Filed: Jun. 28, 2016

(86) PCT No.: PCT/KR2016/006904
§ 371 (c)(1),
(2) Date: Dec. 1, 2017

(87) PCT Pub. No.: WO2017/003156
PCT Pub. Date: Jan. 5, 2017

(65) Prior Publication Data
US 2018/0220481 A1    Aug. 2, 2018

Related U.S. Application Data

(60) Provisional application No. 62/185,739, filed on Jun. 29, 2015.

(51) Int. Cl.
*H04W 72/04*    (2009.01)
*H04W 76/14*    (2018.01)
(Continued)

(52) U.S. Cl.
CPC .......... *H04W 76/14* (2018.02); *H04L 1/1816* (2013.01); *H04W 72/1278* (2013.01); *H04W 72/121* (2013.01)

(58) Field of Classification Search
CPC . H04W 76/14; H04W 72/1278; H04W 72/12; H04W 72/121; H04L 1/1816; H04L 1/18; H04L 5/00; H04L 25/03
See application file for complete search history.

(56) References Cited

U.S. PATENT DOCUMENTS 9,380,442 B2\*  6/2016  Turtinen ............... H04W 8/005
2011/0021224 A1\* 1/2011  Koskinen ........... H04W 72/005
                                                      455/507
(Continued)

FOREIGN PATENT DOCUMENTS

KR   10-2012-0024217 A   3/2012
WO   WO 2007/143753 A2   12/2007
(Continued)

OTHER PUBLICATIONS

Militano et al., "When D2D communication improves group oriented services in beyond 4G networks," Wireless Network, vol. 2, No. 4, ACM, 2 Penn Plaza, Suite 701, New York USA, Nov. 25, 2014, XP035492723, pp. 1363-1377.

*Primary Examiner* — Hassan Kizou
*Assistant Examiner* — Mahbubul Bar Chowdhury
(74) *Attorney, Agent, or Firm* — Birch, Stewart, Kolasch & Birch, LLP

(57) ABSTRACT

A method of transmitting a device-to-device (D2D) signal by a first D2D user equipment (UE) supporting D2D communication. A first D2D UE requests a second D2D UE to repeatedly broadcast or multicast the D2D data together with the first D2D UE on a same time-frequency resource based on a single frequency network (SFN) scheme. In addition, scheduling assignment information includes information for (Continued)

restricting the second D2D UE from broadcasting or multicasting the D2D data received from the first D2D UE according to the request of the first D2D UE based on the SFN scheme when a distance from the first D2D UE is equal to or greater than a preset distance.

5 Claims, 12 Drawing Sheets

(51) Int. Cl.
    *H04L 1/18*     (2006.01)
    *H04W 72/12*     (2009.01)

(56) References Cited

U.S. PATENT DOCUMENTS

| | | |
|---|---|---|
| 2013/0322413 A1 | 12/2013 | Pelletier et al. |
| 2014/0133332 A1* | 5/2014 | Lee .................. H04W 88/04 370/252 |
| 2015/0078279 A1* | 3/2015 | Ko .................. H04W 76/14 370/329 |
| 2016/0044634 A1 | 2/2016 | Seo et al. |
| 2016/0044668 A1* | 2/2016 | Yoon .................. H04L 5/14 370/280 |
| 2016/0338095 A1* | 11/2016 | Faurie ............... H04W 28/0278 |
| 2017/0150475 A1* | 5/2017 | Li .................. H04W 76/23 |
| 2018/0069664 A1* | 3/2018 | Khoryaev ............. H04L 1/1621 |

FOREIGN PATENT DOCUMENTS

| | | |
|---|---|---|
| WO | WO 2013/191518 A1 | 12/2013 |
| WO | WO 2014/163335 A1 | 10/2014 |
| WO | WO 2015/069051 A1 | 5/2015 |

\* cited by examiner (a) CONTROL-PLANE PROTOCOL STACK (b) USER-PLANE PROTOCOL STACK (a) in coverage  (b) out-of-coverage  (c) partial coverage

METHOD FOR TRANSMITTING OR RECEIVING D2D SIGNALS USING A SINGLE FREQUENCY NETWORK SCHEME IN WIRELESS COMMUNICATION SYSTEM, AND APPARATUS FOR SAME

CROSS REFERENCE TO RELATED APPLICATIONS

This application is the National Phase of PCT International Application No. PCT/KR2016/006904, filed on Jun. 28, 2016, which claims priority under 35 U.S.C. 119(e) to U.S. Provisional Application No. 62/185,739, filed on Jun. 29, 2015, all of which are hereby expressly incorporated by reference into the present application.

TECHNICAL FIELD

The present invention relates to a wireless communication system, and more particularly, to a method of transmitting or receiving a D2D (device-to-device) control signal and/or a D2D data signal in a wireless communication system supporting D2D communication and an apparatus therefor.

BACKGROUND ART

As an example of a mobile communication system to which the present invention is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LIE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

DISCLOSURE OF THE INVENTION

Technical Task

A technical task of the present invention is to provide a method of transmitting a D2D signal using an SFN scheme in a wireless communication system supporting D2D communication and an apparatus therefor.

Technical Solution

In an aspect of the present invention, a method of transmitting a D2D signal by a first user equipment (UE) supporting D2D communication, includes transmitting SA (scheduling assignment) information for scheduling D2D data to a second UE, and transmitting the D2D data to the second UE according to the SA information. In this case, the D2D data is repeatedly transmitted by the first UE and the first UE may request the second UE to repeatedly transmit the D2D data together with the first UE on the same time-frequency resource according to a single frequency network (SFN) scheme.

Preferably, the first UE may request the second UE to perform the SFN scheme based transmission by including an SFN request in the SA information or setting a priority to the D2D data.

Preferably, the first UE may request the second UE to perform the SFN scheme based transmission by transmitting the D2D data via a resource configured for SFN among a plurality of D2D resources.

Preferably, the first UE may request the second UE to perform the SFN scheme based transmission by using a specific parameter indicating SFN in generating a signal of the D2D data. More preferably, the specific parameter indicating the SFN can include at least one of a cyclic shift value of an reference signal, an orthogonal cover code value of the reference signal, base sequence information of the reference signal, and data scrambling information.

Preferably, the SA information can include information for restricting the SFN scheme based transmission when a distance from the first UE is equal to or greater than a prescribed distance. More preferably, the information for restricting the SFN scheme based transmission can include at least one of hop count information, information on transmission timing of the first UE, and location information of the first UE.

In other aspect of the present invention, a method of receiving a D2D signal from a first user equipment (UE) by a second UE supporting D2D communication, includes receiving SA (scheduling assignment) information and D2D data scheduled by the SA information from the first UE, and decoding the D2D data based on the SA information. In this case, if the first UE requests the second UE to perform a single frequency network (SFN) scheme based transmission, the second UE can repeatedly transmit the D2D data together with the first UE on the same time-frequency resource.

Preferably, the second UE can determine whether to perform the SFN scheme based transmission based on an SFN request included in the SA information or a priority set to the D2D data.

Preferably, the second UE can determine whether to perform the SFN scheme based transmission based on whether or not the D2D data is received via a resource configured for SFN among a plurality of D2D resources.

Preferably, the second UE can determine whether to perform the SFN scheme based transmission based on whether or not a specific parameter indicating SFN is used for decoding the D2D data. More preferably, the specific parameter indicating the SFN can include at least one of a cyclic shift value of a reference signal, an orthogonal cover code value of the reference signal, base sequence information of the reference signal, and data scrambling information.

Preferably, the second UE may not perform the SFN scheme based transmission when a distance from the first UE is equal to or greater than a prescribed distance. More preferably, the distance from the first UE can be estimated using at least one of hop count information, information on transmission timing of the first UE, and location information of the first UE.

According to another aspect of the present invention, a UE for performing the aforementioned D2D signal transmission method or the D2D signal reception method can be presented.

Advantageous Effects

According to one embodiment of the present invention, since a D2D signal is transmitted using an SFN scheme, the coverage of the D2D signal increases and efficiency in using a radio resource can be enhanced. Moreover, since whether to perform SFN is determined in consideration of a distance from a source device, a problem caused by mutual interference between SFN UEs can be solved.

Effects obtainable from the present invention are non-limited by the above mentioned effect. And, other unmentioned effects can be clearly understood from the following description by those having ordinary skill in the technical field to which the present invention pertains.

MODE FOR INVENTION

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications. In the present disclosure, a base station (eNB) may be used as a broad meaning including a remote radio head (RRH), an eNB, a transmission point (TP), a reception point (RP), a relay, etc.

Figure 1:
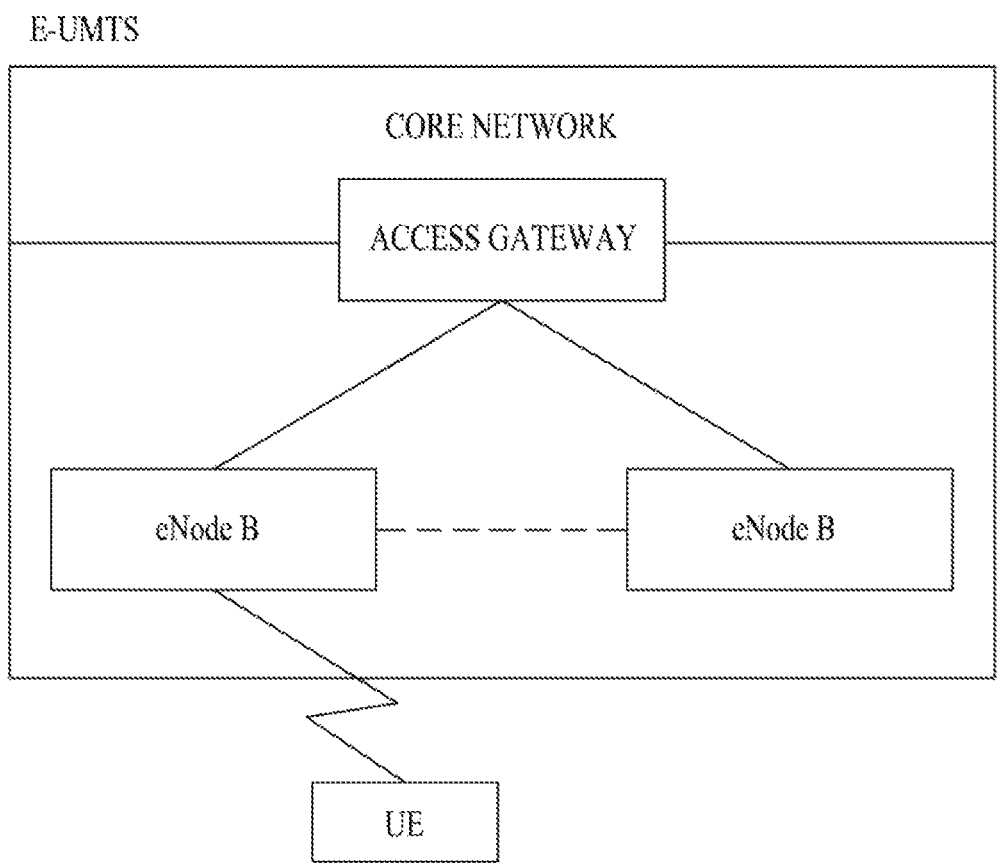
FIG. 1 is a diagram schematically illustrating a network structure of an E-UMTS as an exemplary radio communication system.
Figure 2:
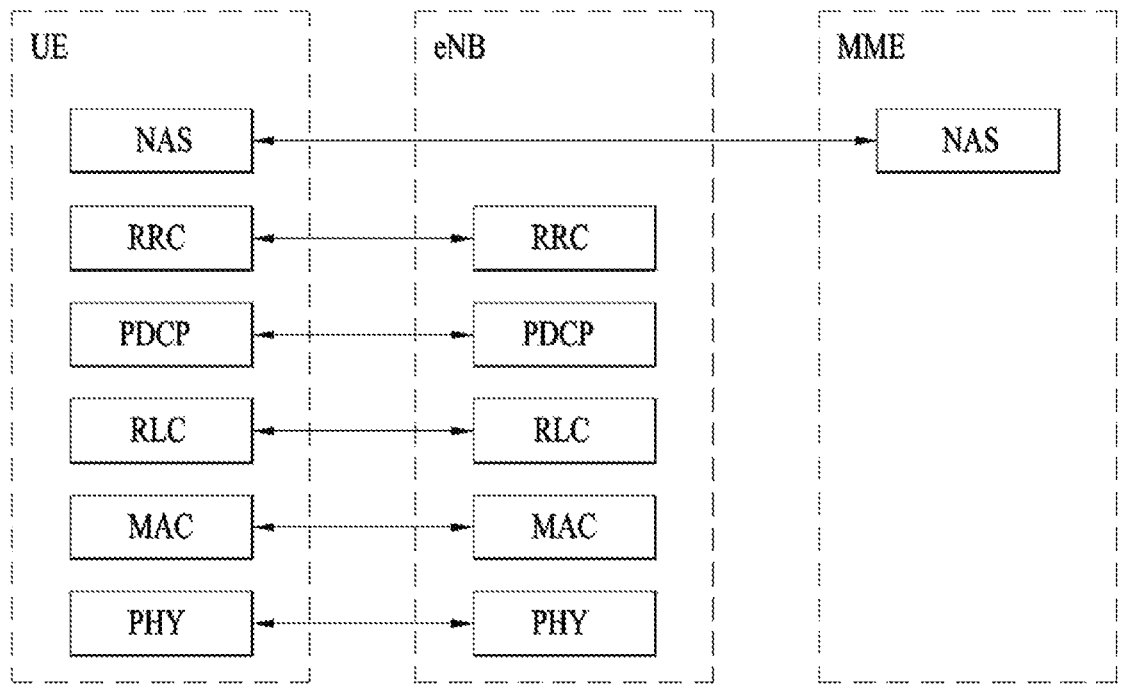
FIG. 2 is a diagram illustrating structures of a control plane and a user plane of a radio interface protocol between a UE and an E-UTRAN based on the 3GPP radio access network specification.
Figure 2:
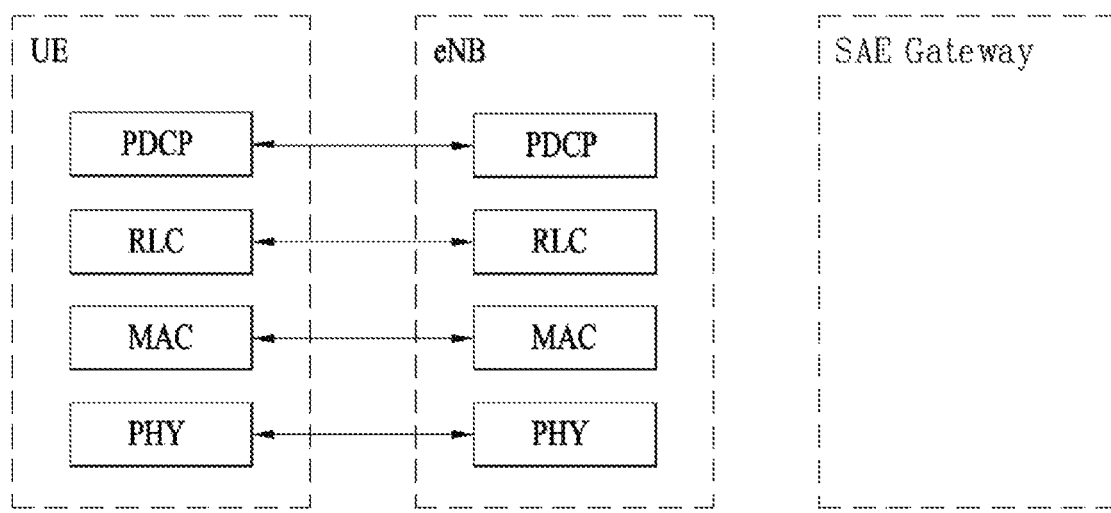

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

A cell constituting an eNB is set to one of the bandwidths of 1.44, 3, 5, 10, 15 and 20 Mhz and provides DL or UL transmission service to a plurality of UEs in the bandwidth. Different cells may be configured so as to provide different bandwidths DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
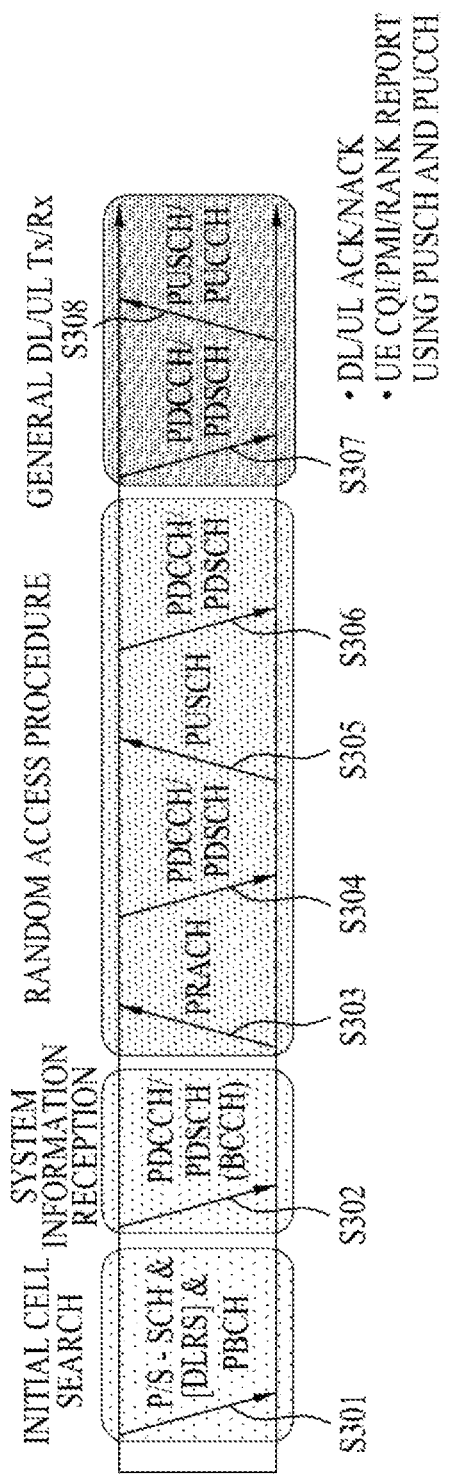
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding, matrix index (PMI), a rank indicator (RI), and the like. In the 3GPP LTE system, the UE may transmit the control information such as CQI/PMI/RI through a PUSCH and/or a PUCCH.

Figure 4:
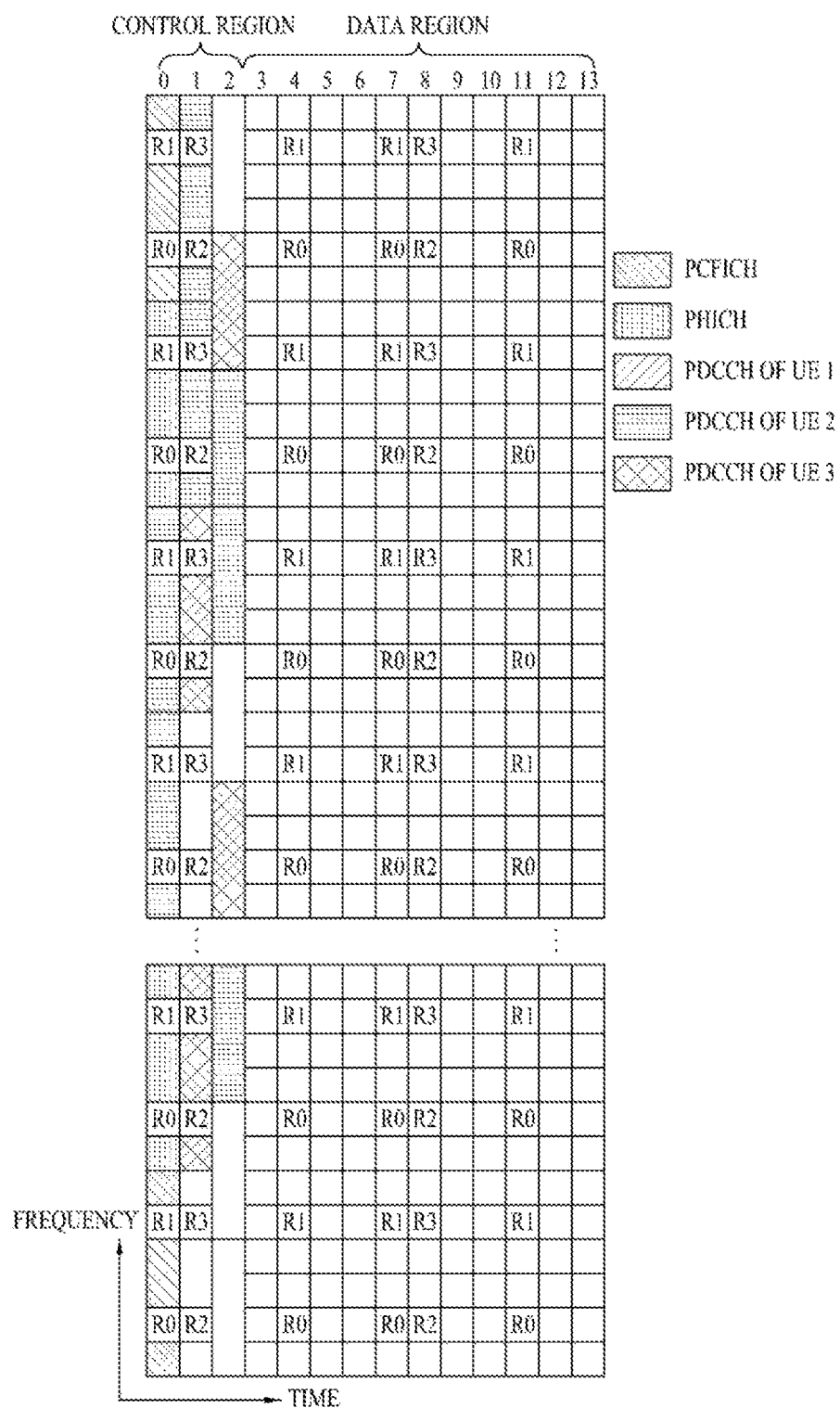
FIG. 4 is a diagram illustrating the structure of a DL radio frame used in an LIE system.

FIG. 4 is a diagram illustrating control channels contained in a control region of one subframe in a DL radio frame.

Referring to FIG. 4, one subframe includes 14 OFDM symbols. The first to third ones of the 14 OFDM symbols may be used as a control region and the remaining 11 to 13 OFDM symbols may be used as a data region, according to subframe configuration. In FIG. 4, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 5:
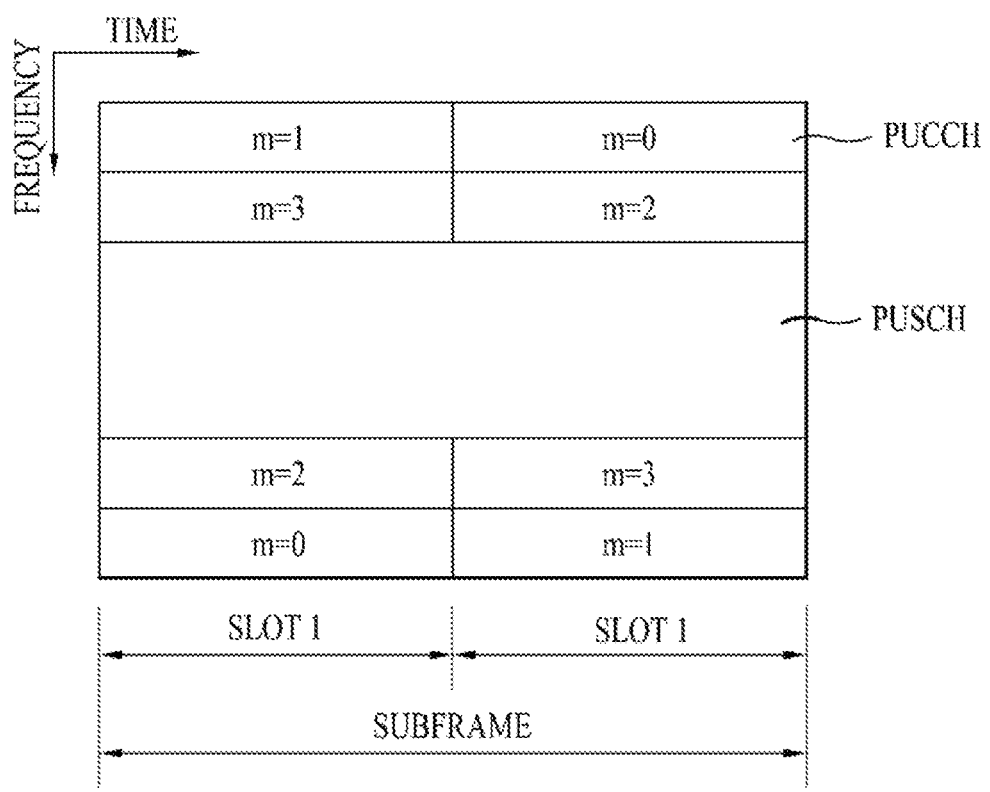
FIG. 5 is a diagram illustrating the structure of a UL subframe in an LTE system.

FIG. 5 is a diagram illustrating the structure of a UL subframe in an LIE system.

Referring to FIG. 5, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 5.

And, time capable of transmitting a sounding reference signal in a subframe corresponds to a symbol period lastly positioned in a subframe in a time axis and the sounding reference signal is transmitted through a data transmission band in frequency axis. Sounding reference signals of a plurality of UEs transmitted through a last symbol of an identical subframe can be distinguished from each other according to a frequency position.

Figure 6:
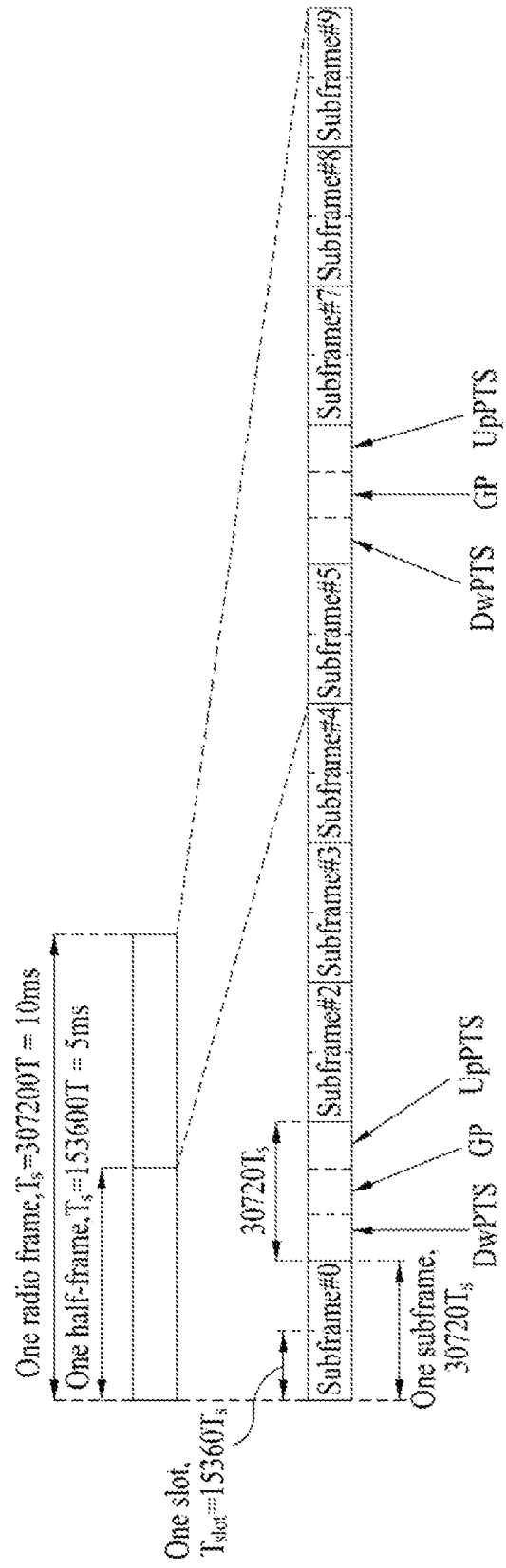
FIG. 6 illustrates a structure of a radio frame in an LIE TDD system.

FIG. 6 illustrates a structure of a radio frame in an LIE TDD system. In the LTE TDD system, a radio frame includes two half frames, and each half frame includes four normal subframes each including two slots, and a special subframe including a downlink pilot time slot (DwPTS), a guard period (GP), and an uplink pilot time slot (UpPTS).

In the special subframe, the DwPTS is used for initial cell search, synchronization, or channel estimation in a eNB. The UpPTS is used for channel estimation in an eNB and uplink transmission synchronization of a UE. That is, the DwPTS is used for downlink transmission and the UpPTS is used for uplink transmission. In particular, the UpPTS is used for transmission of a PRACH preamble or SRS. In addition, the GP is a period for removing interference generated in uplink due to multipath delay of a downlink signal between uplink and downlink.

Meanwhile, in an LTE TDD system, a UL/DL configuration is shown in Table 1 below.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1 above, D, U, and S refer to a downlink subframe, an uplink subframe, and the special subframe. In addition, Table 1 also shows downlink-to-uplink switch-point periodicity in an uplink/downlink subframe configuration in each system.

Figure 7:
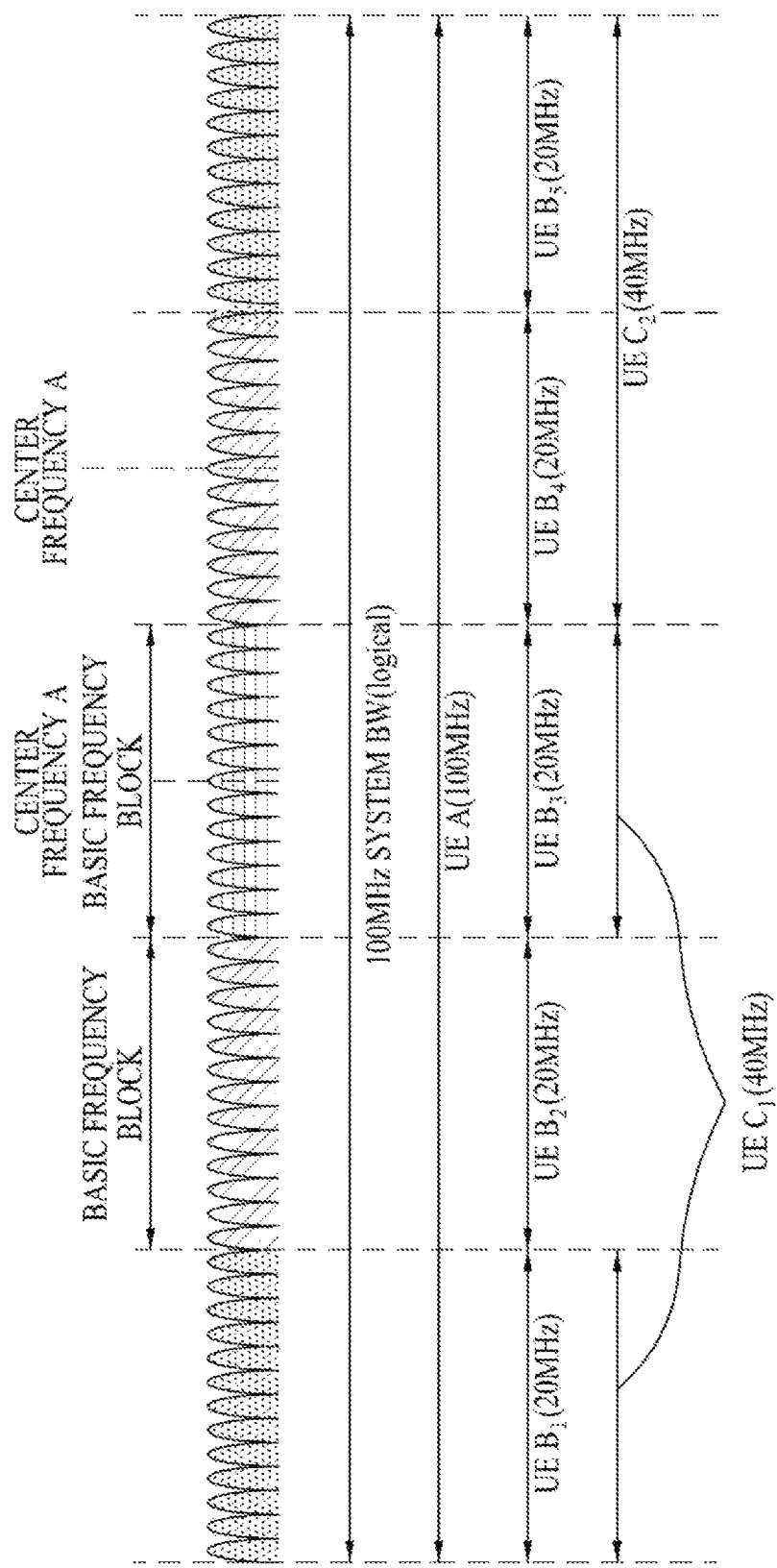
FIG. 7 is a view illustrating concept of a carrier aggregation scheme.

Hereinafter, a carrier aggregation scheme will be described. FIG. 7 is a view illustrating concept of a carrier aggregation scheme.

The carrier aggregation refers to a method of using a plurality of frequency blocks or (logical) cells including uplink resources (or component carriers) and/or downlink resources (or component carriers) by a UE as one large logical frequency band in order to use a wider frequency band by a wireless communication system. Hereinafter, for convenience of description, the term 'component carrier' will consistently used.

Figure 8:
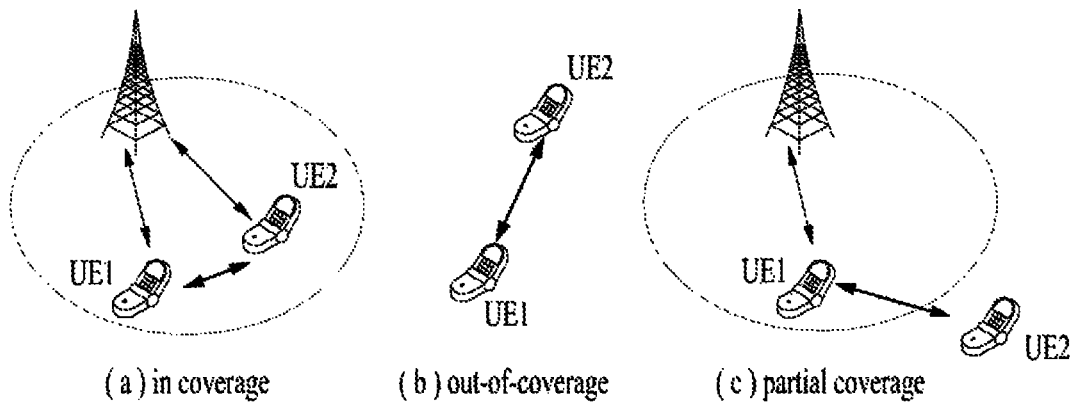
FIG. 8 is a diagram illustrating exemplary scenarios of D2D communication.

Referring to FIG. 7, a system bandwidth (system BW) has a maximum of 100 MHz as a logical bandwidth. The system BW includes five component carriers. Each component carrier has a maximum of 20 MHz of bandwidth. A component carrier includes one or more physically consecutive subcarriers. Although FIG. 7 illustrates the case in which component carriers have the same bandwidth, the case is purely exemplary, and thus, the component carriers may have different bandwidths. In addition, although FIG. 7 illustrates the case in which the component carriers are adjacent to each other in the frequency domain, FIG. 8 are logically illustrated, and thus, the component carriers may be physically adjacent to each other or may be spaced apart from each other.

Component carriers can use different center frequencies or use one common center frequency with respect to physically adjacent component carriers. For example, in FIG. 8, assuming all component carriers are physically adjacent to each other, center frequency A may be used. In addition, assuming that component carriers are not physically adjacent to each other, center frequency A, center frequency B, etc. may be used with respect to the respective component carriers.

Throughout this specification, a component carrier may correspond to a system band of a legacy system. The component carrier is defined based on a legacy system, and thus, it can be easy to provide backward compatibility and to design the system in a wireless communication environment in which an evolved UE and a legacy UE coexist. For example, when an LTE-A system supports carrier aggregation, each component carrier may corresponds to a system band of an LTE system. In this case, the component carrier may have any one of bandwidths of 1.25, 2.5, 5, 10, and 20 Mhz.

When a system band is extended via carrier aggregation, a frequency band used for communication with each UE is defined in a component carrier unit. UE A may use 100 MHz as a system band and perform communication using all five component carriers. UEs $B_1$ to $B_5$ can use only a bandwidth of 20 MHz and perform communication using one component carrier. UEs $C_1$ and $C_2$ can use a bandwidth of 40 MHz and communication using two component carries. The two component carriers may or may not be logically/physically adjacent to each other. UE $C_1$ refers to the case in which two component carriers that are not adjacent to each other are used and UE $C_2$ refers to the case in which two adjacent component carriers are used.

An LTE system may use one downlink component carrier and one uplink component carrier, whereas an LTE-A system may use a plurality of component carriers as illustrated in FIG. 7. In this case, a method for scheduling a data channel by a control channel may be classified into a linked carrier scheduling method and a cross carrier scheduling method.

In more detail, in the linked carrier scheduling method, a control channel transmitted through a specific component carrier schedules only a data channel through the specific component carrier like in a legacy LTE system using a single component carrier.

Meanwhile, in the cross carrier scheduling method, a control channel transmitted through a primary component carrier (primary CC) using a carrier indicator field (CIF) schedules a data channel transmitted through a data channel transmitted through the primary CC or a secondary CC.

A description will be given of a method for controlling uplink transmission power in an LTE system.

A method for controlling, by a UE, uplink transmission power thereof includes open loop power control (OLPC) and closed loop power control (CLPC). The former controls power in such a manner that attenuation of a downlink signal from a base station of a cell to which a UE belongs is estimated and compensated for. OLPC controls uplink power by increasing uplink transmission power when downlink signal attenuation increases as a distance between the UE and the base station increases. The latter controls uplink power in such a manner that the base station directly transmits information (i.e. a control signal) necessary to control uplink transmission power.

The following equation 1 is used to determine transmission power of a UE when a serving cell c transmits only a PUSCH instead of simultaneously transmitting the PUSCH and a PUCCH in a subframe corresponding to a subframe index i in a system that supports carrier aggregation.

$$P_{PUSCH,c}(i) = \min\begin{Bmatrix} P_{CMAX,c}(i), \\ 10\log_{10}(M_{PUSCH,c}(i)) + P_{O\_PUSCH,c}(j) + \\ \alpha_c(j)\cdot PL_c + \Delta_{TF,c}(i) + f_c(i) \end{Bmatrix}[dBm]$$ [Equation 1]

The following equation 2 is used to determine PUSCH transmission power when the serving cell c simultaneously transmits the PUCCH and the PUSCH in the subframe corresponding to the subframe index i in a system supporting carrier aggregation.

$$P_{PUSCH,c}(i) = \min\begin{Bmatrix} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ \alpha_c(j)\cdot PL_c + \Delta_{TF,c}(i) + f_c(i) \end{Bmatrix}[dBm]$$ [Equation 2]

Parameters, which will be described in association with Equations 1 and 2, determine uplink transmission power of a UE in the serving cell c. Here, $P_{CMAX,c}(i)$ in Equation 1 indicates maximum transmittable power of the UE in the subframe corresponding to the subframe index i and $\hat{P}_{CMAX,c}(i)$ in Equation 2 indicates a linear value of $P_{CMAX,c}(i)$ $\hat{P}_{PUCCH}(i)$ in Equation 2 indicates a linear value of $P_{PUCCH}(i)$ ($P_{PUCCH}(i)$ indicating PUCCH transmission power in the subframe corresponding to subframe index i).

In Equation 1, $M_{PUSCH,c}(i)$ is a parameter indicating a PUSCH resource allocation bandwidth, which is represented as the number of resource blocks valid for the subframe index i, and is allocated by a base station. $P_{O\_PUSCH,c}(j)$ is a parameter corresponding to the sum of a cell-specific nominal component $P_{O\_NOMINAL\_PUSCH,c}$ (j) provided by a higher layer and a UE-specific component $P_{O\_UE\_PUSCH,c}(j)$ provided by the higher layer and is signaled to the UE by the base station.

j is 1 in PUSCH transmission/retransmission according to an uplink grant and j is 2 in PUSCH transmission/retransmission according to a random access response. In addition, $P_{O\_UE\_PUSCH,c}(2)=0$ and $P_{O\_NOMINAL\_PUSCH,c}(2)=P_{O\_PRE}+\Delta_{PREAMBLE\_Msg3}$. Parameters $P_{O\_PRE}$ and $\Delta_{PREAMBLE\_Msg3}$ are signaled by the higher layer.

$\alpha_c(j)$ is a pathloss compensation factor and a cell-specific parameter provided by the higher layer and transmitted as 3 bits by the base station. $\alpha \in \{0, 0.4, 0.5, 0.6, 0.7, 0.8, 0.9, 1\}$ when j is 0 or 1 and $\alpha_c(j)=1$ when j is 2. $\alpha_c(j)$ is a value signaled to the UE by the base station.

Pathloss $PL_c$ is a downlink pathloss (or signal loss) estimate value in dBs, calculated by the UE, and is represented as $PL_c$=referenceSignalPower−higher layer filteredRSRP. Here, referenceSignalPower can be signaled to the UE by the base station via the higher layer.

$f_c(i)$ is a value indicating current PUSCH power control adjustment state for the subframe index i and can be represented as a current absolute value or accumulated value. When accumulation is enabled on the basis of a parameter provided by the higher layer or a TPC command $\delta_{PUSCH,c}$ is included in a PDCCH along with DCI format 0 for the serving cell c in which CRC is scrambled with temporary C-RNTI, $f_c(i)=f_c(i-1)+\delta_{PUSCH,c}(i-K_{PUSCH})$ is satisfied. $\delta_{PUSCH,c}(i-K_{PUSCH})$ is signaled through the PDCCH with DCI format 0/4 or 3/3A in a subframe i−$K_{PUSCH}$. Here, $f_c(0)$ is the first value after reset of the accumulated value.

$K_{PUSCH}$ is defined in LTE as follows.

For FDD (Frequency Division Duplex), $K_{PUSCH}$ has a value of 4. As to TDD, $K_{PUSCH}$ has values as shown in Table 2.

TABLE 2

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |

TABLE 2-continued

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

The UE attempts to decode a PDCCH in DCI format 0/4 with C-RNTI thereof or to decode a PDCCH in DCI format 3/3A and a DCI format for SPS C-RNTI with TPC-PUSCH-RNTI thereof in each subframe in cases other than DRX state. When DCI formats 0/4 and 3/3A for the serving cell c are detected in the same subframe, the UE needs to use $\delta_{PUSCH,c}$ provided in DCI format 0/4. When a TPC command decoded for the serving cell c is not present, DRX is generated or a subframe having index i is a subframe other than an uplink subframe in TDD, $\delta_{PUSCH,c}$ is 0 dB.

Accumulated $\delta_{PUSCH,c}$ which is signaled together with DCI format 0/4 on a PDCCH, is shown in Table 3. When a PDCCH with DCI format 0 is validated through SPS activation or released, $\delta_{PUSCH,c}$ is 0 dB. Accumulated $\delta_{PUSCH,c}$ which is signaled with DCI format 3/3A on a PDCCH, is one of SET1 of Table 3 or one of SET2 of Table 4, determined by a TPC-index parameter provided by the higher layer.

TABLE 3

| TPC Command Field in DCI format 0/3/4 | Accumulated $\delta_{PUSCH, c}$ [dB] | Absolute $\delta_{PUSCH, c}$ [dB] only DCI format 0/4 |
|---|---|---|
| 0 | −1 | −4 |
| 1 | 0 | −1 |
| 2 | 1 | 1 |
| 3 | 3 | 4 |

TABLE 4

| TPC Command Field in DCI format 3A | Accumulated $\delta_{PUSCH, c}$ [dB] |
|---|---|
| 0 | −1 |
| 1 | 1 |

When the UE reaches maximum transmission power $\hat{P}_{CMAX}(i)$ in the serving cell c, a positive TPC command is not accumulated for the serving cell c. Conversely, when the UE reaches minimum transmission power, a negative TPC command is not accumulated.

The following equation 3 is related to uplink power control with respect to a PUCCH in LIE.

$$P_{PUCCH}(i) = \min\left\{\begin{array}{l} P_{CMAX,c}(i), \\ P_{O\_PUCCH} + PL_c + h(n_{CQI}, n_{HARQ}, n_{SR}) + \\ \Delta_{F\_PUCCH}(F) + \Delta_{TxD}(F') + g(i) \end{array}\right\} [\text{dBm}] \quad \text{[Equation 3]}$$

In Equation 3, i indicates a subframe index and c indicates a cell index. When a UE is configured by a higher layer to transmit a PUCCH over through antenna ports, $\Delta_{TxD}(F')$ is provided to the UE by the higher layer. In other cases, $\Delta_{TxD}(F')$ is 0. Parameters with respect to a cell having the cell index c will now be described.

$P_{CMAX,c}(i)$ indicates maximum transmission power of a UE, $P_{O\_PUCCH}$ is a parameter corresponding to the sum of cell-specific parameters and signaled by a base station through higher layer signaling, $PL_c$ is a downlink pathloss (or signal loss) estimate value calculated in dBs by the UE and is represented as $PL_c$=referenceSignalPower−higher layer filteredRSRP. h(n) is a value depending on PUCCH format, $n_{CQI}$ is the number of information bits with respect to channel quality information (CQI) and $n_{HARQ}$ indicates the number of HARQ bits. In addition, $\Delta_{F\_PUCCH}(F)$ is a relative value with respect to PUCCH format 1a and a value corresponding to PUCCH format #F, which is signaled by the base station through higher layer signaling. g(i) indicates a current PUCCH power control adjustment state of a subframe having index i.

g(0)=0 when $P_{O\_UE\_PUCCH}$ is changed in the higher layer and g(0)=$\Delta P_{rampup}$+$\delta_{msg2}$ otherwise. $\delta_{msg2}$ is a TPC command indicated in a random access response $\Delta P_{rampup}$ corresponds to total power ramp-up from the first to last preambles, provided by the higher layer.

When a UE reaches maximum transmission power $P_{CMAX,c}(i)$ in a primary cell, a positive TPC command is not accumulated for the primary cell. When the UE reaches minimum transmission power, a negative TPC command is not accumulated. The UE resets accumulation when $P_{O\_UE\_PUCCH}$ is changed by the higher layer or upon reception of a random access response.

Tables 5 and 6 show $\delta_{PUCCH}$ indicated by a TPC command in DCI formats. Particularly, Table 5 shows $\delta_{PUCCH}$ indicated in DCI formats other than DCI format 3A and Table 6 shows $\delta_{PUCCH}$ indicated in DCI format 3A.

TABLE 5

| TPC Command Field in DCI format 1A/1B/1D/1/2A/2B/2C/2D/2/3 | $\delta_{PUCCH}$ [dB] |
|---|---|
| 0 | −1 |
| 1 | 0 |
| 2 | 1 |
| 3 | 3 |

TABLE 6

| TPC Command Field in DCI format 3A | $\delta_{PUCCH}$ [dB] |
|---|---|
| 0 | −1 |
| 1 | 1 |

Equation 4 in the following corresponds to an equation related to power control of a sounding reference signal (SRS) in LTE system.

$$P_{SRS,c}(i) = \min\left\{\begin{array}{l} P_{CMAX,c}(i) \\ P_{SRS\_OFFSET,c}(m) + 10\log_{10}(M_{SRS,c}) + \\ P_{O\_PUSCH,c}(j) + \alpha_c(j) \cdot PL_c + f_c(i) \end{array}\right\} [\text{dBm}] \quad \text{[Equation 4]}$$

In Equation 4, i corresponds to a subframe index and c corresponds to a cell index. In this case, $P_{CMAX,c}(i)$ corresponds to maximum power capable of being transmitted by a UE and $P_{SRS\_OFFSET,c}(m)$ corresponds to a value configured by an upper layer. If m is 0, it may correspond to a case of transmitting a periodic sounding reference signal. If m is not 0, it may correspond to a case of transmitting an aperiodic sounding reference signal. $M_{SRS,c}$ corresponds to a sounding reference signal bandwidth on a subframe index i of a serving cell c and is represented by the number of resource blocks.

$f_c(i)$ corresponds to a value indicating a current PUSCH power control adjustment status for a subframe index i of a serving cell c. $P_{O\_PUSCH,c}(j)$ and $\alpha_c(j)$ are also identical to what is mentioned earlier in Equation 1 and 2.

Hereinafter, a Sounding Reference Signal (SRS) will be described.

The SRS is composed of constant amplitude zero auto correlation (CAZAC) sequences. SRSs transmitted from several UEs are CAZAC sequences $r^{SRS}(n)=r_{u,v}^{(\alpha)}(n)$ having different cyclic shift values a according to Equation 1.

$$\alpha = 2\pi \frac{n_{SRS}^{cs}}{8} \qquad \text{[Equation 1]}$$

where, $n_{SRS}^{cs}$ is a value set to each UE by a higher layer and has an integer value of 0 to 7. Accordingly, the cyclic shift value may have eight values according to $n_{SRS}^{cs}$.

CAZAC sequences generated from one CAZAC sequence through cyclic shift have zero correlation values with sequences having different cyclic shift values. Using such property, SRSs of the same frequency domain may be divided according to CAZAC sequence cyclic shift values. The SRS of each UE is allocated onto the frequency axis according to a parameter set by the eNB. The UE performs frequency hopping of the SRS so as to transmit the SRS with an overall uplink data transmission bandwidth.

Hereinafter, a detailed method of mapping physical resources for transmitting SRSs in an LTE system will be described.

In order to satisfy transmit power $P_{SRS}$ of a UE, an SRS sequence $r^{SRS}(n)$ is first multiplied by an amplitude scaling factor $\beta_{SRS}$ and is then mapped to a resource element (RE) having an index (k, l) from $r^{SRS}(0)$ by Equation 6.

$$a_{2k+k_0,l} = \begin{cases} \beta_{SRS} r^{SRS}(k) & k = 0, 1, \ldots, M_{sc,b}^{RS} - 1 \\ 0 & \text{otherwise} \end{cases} \qquad \text{[Equation 6]}$$

where, $k_0$ denotes a frequency domain start point of an SRS and is defined by Equation 7.

$$k_0 = k'_0 + \sum_{b=0}^{B_{SRS}} 2 M_{sc,b}^{RS} n_b \qquad \text{[Equation 7]}$$

where, $n_b$ denotes a frequency location index. $k'_0$ for a general uplink subframe is defined by Equation 8 and $k'_0$ for an uplink pilot time is defined by Equation 9.

$$k'_0 = (\lfloor N_{RB}^{UL}/2 \rfloor - m_{SRS,0}/2) N_{SC}^{RB} + k_{TC} \qquad \text{[Equation 8]}$$

$$k'_0 = \qquad \text{[Equation 9]}$$
$$\begin{cases} (N_{RB}^{UL} - m_{SRS,0}^{max}) N_{sc}^{RB} + k_{TC} & \text{if } ((n_f \mod 2) \times (2 - N_{SP}) + n_{hf}) \\ & \mod 2 = 0 \\ k_{TC} & \text{otherwise} \end{cases}$$

In Equations 4 and 5, $k_{TC}$ denotes a transmissionComb parameter signaled to a UE via a higher layer and has a value of 0 or 1. In addition, $n_{hf}$ is 0 in an uplink pilot time slot of a first half frame and is 0 an uplink pilot slot of a second half frame. $M_{sc,b}^{RS}$ is the length, that is, the bandwidth, if the SRS sequence expressed in subcarrier units defined by Equation 10.

$$M_{sc,b}^{RS} = m_{SRS,b} N_{sc}^{RB}/2 \qquad \text{[Equation 10]}$$

In Equation 10, $m_{SRS,b}$ is a value signaled from an eNB according to an uplink bandwidth $N_{RB}^{UL}$.

The UE may perform frequency hopping of the SRS so as to transmit the SRS with the overall uplink data transmission bandwidth. Such frequency hopping is set by a parameter $b_{hop}$ having a value of 0 to 3 received from a higher layer.

If frequency hopping of the SRS is inactivated, that is, if $b_{hop} \geq B_{SRS}$, a frequency location index $n_b$ has a constant value as shown in Equation 11. Here, $n_{RRC}$ is a parameter received from a higher layer.

$$n_b = \lfloor 4 n_{RRC}/m_{SRS,b} \rfloor \mod N_b \qquad \text{[Equation 11]}$$

Meanwhile, if frequency hopping of the SRS is activated, that is, $b_{hop} < B_{SRS}$, a frequency location index $n_b$ is defined by Equations 12 and 13.

$$n_b = \begin{cases} \lfloor 4 n_{RRC}/m_{SRS,b} \rfloor \mod N_b & b \leq b_{hop} \\ \{F_b(n_{SRS}) + \lfloor 4 n_{RRC}/m_{SRS,b} \rfloor\} \mod N_b & \text{otherwise} \end{cases} \qquad \text{[Equation 12]}$$

$$F_b(N_{SRS}) = \begin{cases} (N_b/2) \left\lfloor \frac{n_{SRS} \mod \prod_{b'=b_{hop}}^{b} N_{b'}}{\prod_{b'=b_{hop}}^{b-1} N_{b'}} \right\rfloor + \\ \qquad \left\lfloor \frac{n_{SRS} \mod \prod_{b'=b_{hop}}^{b} N_{b'}}{2 \prod_{b'=b_{hop}}^{b-1} N_{b'}} \right\rfloor & \text{if } N_b \text{ even} \\ \lfloor N_b/2 \rfloor \left\lfloor n_{SRS} / \prod_{b'=b_{hop}}^{b-1} N_{b'} \right\rfloor & \text{if } N_b \text{ odd} \end{cases} \qquad \text{[Equation 13]}$$

where, $n_{SRS}$ is a parameter used to calculate the number of times of transmitting the SRS and is defined by Equation 14.

$$n_{SRS} = \begin{cases} 2 N_{SP} n_f + 2(N_{SP} - 1) \lfloor \frac{n_s}{10} \rfloor + \lfloor \frac{T_{offset}}{T_{offset\_max}} \rfloor, & \text{for 2ms SRS periodicity of TDD frame structure} \\ \lfloor (n_f \times 10 + \lfloor n_s/2 \rfloor)/T_{SRS} \rfloor, & \text{otherwise} \end{cases} \qquad \text{[Equation 14]}$$

In Equation 14, $T_{SRS}$ denotes the periodicity of an SRS and $T_{offset}$ denotes a subframe offset of an SRS. In addition, $n_s$ denotes a slot number and $n_f$ denotes a frame number.

A UE-specific SRS configuration index $I_{SRS}$ for setting the periodicity $T_{SRS}$ and the subframe offset $T_{offset}$ of a UE-specific SRS signal is shown in Table 7-Table 10 according to FDD and TDD. In particular, Table 7 and Table 8 indicate a FDD system and a TDD system, respectively. Table 7 and Table 8 in the following show a period related to a triggering type 0, i.e., a periodic SRS, and offset information.

TABLE 7

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS} - 2$ |
| 7-16 | 10 | $I_{SRS} - 7$ |
| 17-36 | 20 | $I_{SRS} - 17$ |
| 37-76 | 40 | $I_{SRS} - 37$ |
| 77-156 | 80 | $I_{SRS} - 77$ |
| 157-316 | 160 | $I_{SRS} - 157$ |
| 317-636 | 320 | $I_{SRS} - 317$ |
| 637-1023 | reserved | reserved |

TABLE 8

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS} - 2$ |
| 7-16 | 10 | $I_{SRS} - 7$ |
| 17-36 | 20 | $I_{SRS} - 17$ |
| 37-76 | 40 | $I_{SRS} - 37$ |
| 77-156 | 80 | $I_{SRS} - 77$ |
| 157-316 | 160 | $I_{SRS} - 157$ |
| 317-636 | 320 | $I_{SRS} - 317$ |
| 637-1023 | reserved | reserved |

Meanwhile, in case of the periodic SRS, transmission is performed in a subframe satisfying Equation 15 in the following in a FDD system or a TDD system where $T_{SRS}$ is greater than 2 ($T_{SRS} > 2$). Yet, in Equation 15, $k_{SRS}$ corresponds to $\{0, 1, \ldots, 9\}$ in case of the FDD system, whereas $k_{SRS}$ is determined according to Table 9 in the following in case of the TDD system.

$$(10 \cdot n_f + k_{SRS} - T_{offset}) \bmod T_{SRS} = 0 \quad \text{[Equation 15]}$$

TABLE 9

| | subframe index n | | | | | | | | | |
|---|---|---|---|---|---|---|---|---|---|---|
| | 1 | | | | | 6 | | | | |
| | 0 | 1st symbol of UpPTS | 2nd symbol of UpPTS | 2 | 3 | 4 | 5 | 1st symbol of UpPTS | 2nd symbol of UpPTS | 7 | 8 | 9 |
| $k_{SRS}$ in case UpPTS length of 2 symbols | 0 | 1 | | 2 | 3 | 4 | | 5 | 6 | 7 | 8 | 9 |
| $k_{SRS}$ in case UpPTS length of 1 symbol | 1 | | | 2 | 3 | 4 | | 6 | | 7 | 8 | 9 |

And, in case of a TDD system where $T_{SRS}$ corresponds to 2 in Table 8, transmission is performed in a subframe satisfying Equation 16 in the following.

$$(k_{SRS} - T_{offset}) \bmod 5 = 0 \quad \text{[Equation 16]}$$

Table 10 and Table 11 in the following show a period related to a triggering type 1, i.e., an aperiodic SRS, and offset information. In particular, Table 10 and Table 11 indicate a FDD system and a TDD system, respectively.

TABLE 10

| SRS Configuration Index $I_{SRS}$ | SRS Periodicity $T_{SRS, 1}$ (ms) | SRS Subframe Offset $T_{offset, 1}$ |
|---|---|---|
| 0-1 | 2 | $I_{SRS}$ |
| 2-6 | 5 | $I_{SRS} - 2$ |

TABLE 10-continued

| SRS Configuration Index $I_{SRS}$ | SRS Periodicity $T_{SRS, 1}$ (ms) | SRS Subframe Offset $T_{offset, 1}$ |
|---|---|---|
| 7-16 | 10 | $I_{SRS} - 7$ |
| 17-31 | reserved | reserved |

TABLE 11

| SRS Configuration Index $I_{SRS}$ | SRS Periodicity $T_{SRS, 1}$ (ms) | SRS Subframe Offset $T_{offset, 1}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS} - 10$ |
| 15-24 | 10 | $I_{SRS} - 15$ |
| 25-31 | reserved | reserved |

Meanwhile, if a triggering bit of the aperiodic SRS is detected in a subframe #n, an aperiodic SRS corresponding to the triggering bit is transmitted in a first subframe satisfying Equation 17 or Equation 18 in the following appearing after a subframe index #n+k (where k≥4). In particular, Equation 17 in the following is used for a FDD system or a TDD system of which $T_{SRS}$ is greater than 2 ($T_{SRS} > 2$) in the Table 11. Equation 18 in the following is used for a TDD system of which $T_{SRS}$ is equal to 2 ($T_{SRS} = 2$) in the Table 11. Yet, in case of the FDD system, $k_{SRS}$ corresponds to $\{0, 1, \ldots, 9\}$. In case of the TDD system, $k_{SRS}$ is determined according to the Table 9.

$$(10 \cdot n_f + k_{SRS} - T_{offset,1}) \bmod T_{SRS,1} = 0 \quad \text{[Equation 17]}$$

$$(k_{SRS} - T_{offset,1}) \bmod 5 = 0 \quad \text{[Equation 18]}$$

D2D (Device to Device) Communication

In the following, D2D communication based on LTE system is explained. D2D can be referred to as direct communication between UEs or a sidelink. In general, a UE corresponds to a terminal of a user. If such a network device as an eNB transmits and receives a signal according to a D2D communication scheme, the network device can also be considered as a UE as well.

FIG. 8 is a diagram illustrating exemplary scenarios of D2D communication. D2D resources can be allocated from a UL resource (e.g., In case of FDD, a UL frequency resource. In case of TDD, a UL subframe). (a) In case of in-coverage D2D communication, a network controls D2D resources used for D2D communication. The network may allocate a specific resource to a transmission UE or may allocate a pool of D2D resources capable of being selected by a UE. (b) In case of out-of-coverage D2D communication, since a network is unable to directly control a D2D resource, a UE uses a preconfigured D2D resource. (c) In case of partial coverage D2D communication, a UE, which is located at the outside of the coverage, is able to use preconfigured parameters. On the contrary, a UE, which is located within the coverage, is able to use a D2D resource obtained from the network.

For clarity, assume that a UE1 selects a resource unit (RU) corresponding to a specific D2D resource from a resource pool and the UE1 transmits a D2D signal using the selected RS. A resource pool corresponds to a set of D2D resources. Assume that a UE2 corresponding to a reception UE receives information on a resource pool in which the UE1 is able to transmit a signal and detects a signal of the UE1 in the resource pool. In this case, if the UE1 is located within a connection range of an eNB, the eNB can inform the UE1 of information on the resource pool. If the UE1 is located at the outside of the connection range of the eNB, the resource pool can be informed by a different UE or can be determined by a predetermined resource. In general, a resource pool includes a plurality of RUs. A UE selects one or more RUs and may be able to use the selected RUs for transmitting a D2D signal of the UE.

Figure 9:
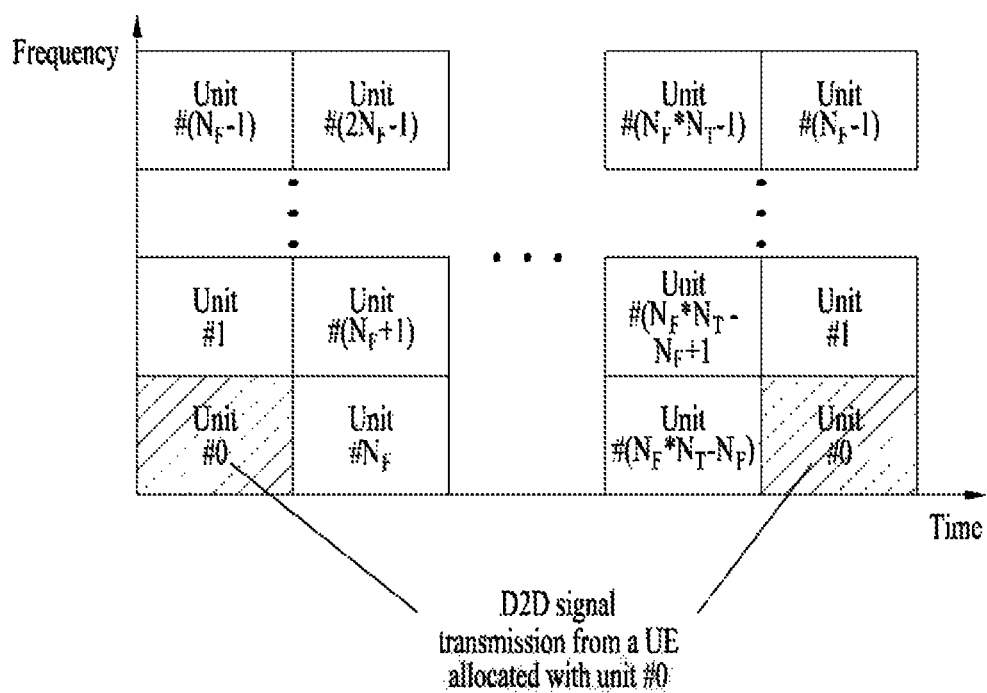
FIG. 9 is a diagram illustrating an example of a D2D RU.

FIG. 9 is a diagram illustrating an example of a D2D RU. For clarity, assume that the entire frequency resources are divided into the $N_F$ number of resource units and the entire time resources are divided into the $N_T$ number of resource units.

In FIG. 9, a resource pool can be repeated with a period of $N_T$ subframes. For example, as shown in FIG. 9, one resource unit may periodically and repeatedly appear.

Or, an index of a physical RU to which a logical RU is mapped may change based on a predetermined pattern over time to obtain a diversity gain in time domain and/or frequency domain. In this RU structure, a resource pool may correspond to a set of resource units capable of being used by a UE intending to transmit a D2D signal.

The aforementioned resource pool can be classified into various types. For example, the resource pool can be classified according to contents of a D2D signal transmitted via each resource pool. For example, the contents of the D2D signal can be classified as follows and a separate resource pool can be configured according to contents of each D2D signal.

Scheduling assignment (SA): The SA may correspond to a signal including information on a resource position of a D2D data channel, information on MCS (modulation and coding scheme) necessary for modulating and demodulating a data channel, information on a MIMO transmission scheme, information on TA (timing advance), and the like. The SA signal can be transmitted on an identical RU in a manner of being multiplexed with D2D data. In this case, an SA resource pool may correspond to a pool of resources that an SA and D2D data are transmitted in a manner of being multiplexed. The SA can be referred to as an SCI (side link control channel) and can be transmitted via a D2D control channel (e.g., PSCCH).

D2D data channel: The D2D data channel corresponds to a channel for transmitting user data scheduled by the SA. It may be able to configure a pool of resources for the D2D data channel.

Discovery channel: The discovery channel corresponds to a channel for transmitting a discovery signal including information on an ID of a transmission UE, and the like to enable a neighboring UE to discover the transmission UE. It may be able to configure a resource pool for the discovery channel.

Meanwhile, although contents of D2D signal are identical to each other, it may use a different resource pool according to a transmission/reception attribute of the D2D signal. For example, in case of a D2D data channel of the same type or a discovery channel of the same type, the D2D data channel or the discovery channel can be transmitted in a different resource pool in consideration of (i) a transmission timing determination scheme of a D2D signal (e.g., whether a D2D signal is transmitted at the time of receiving a synchronization reference signal or the timing to which a prescribed timing advance is added), (ii) a resource allocation scheme (e.g., whether a transmission resource of an individual D2D signal is designated by an eNB or a transmission UE autonomously selects a D2D signal transmission resource from a resource pool), (iii) a signal format (e.g., number of symbols occupied by a D2D signal in a subframe, number of subframes used for transmitting a D2D signal), (iv) signal strength from an eNB, (v) strength of transmit power of a D2D UE, and the like.

As mentioned in the foregoing description, such a term as 'D2D' can also be referred to as 'SL (side link)' and 'SA' can also be referred to as PSCCH (physical sidelink control channel). A D2D synchronization signal can be referred to as an SSS (sidelink synchronization signal) and the SSS can be transmitted via a PSBCH (physical sidelink broadcast channel). The PSBCH transmits most basic information (e.g., system information such as SL-MIB, etc.) prior to D2D communication and can also be referred to as a PD2DSCH (physical D2D synchronization channel). A UE transmits a signal (e.g., a discovery signal including an ID of the UE) to a neighboring UE using a discovery channel to inform the neighboring UE of the existence of the UE. The discovery channel is referred to as a PSDCH (physical sidelink discovery channel).

D2D communication of a narrow sense can be distinguished from D2D discovery. For example, if only a UE performing the D2D communication of a narrow sense transmits PSBCH together with SSS (except a UE performing D2D discovery), the SSS can be measured using a DMRS of the PSBCH. An out-of-coverage UE measures the DMRS of the PSBCH (e.g., RSRP, etc.) and may be then able to determine whether or not the UE becomes a synchronization source based on a measurement result.

Figure 10:
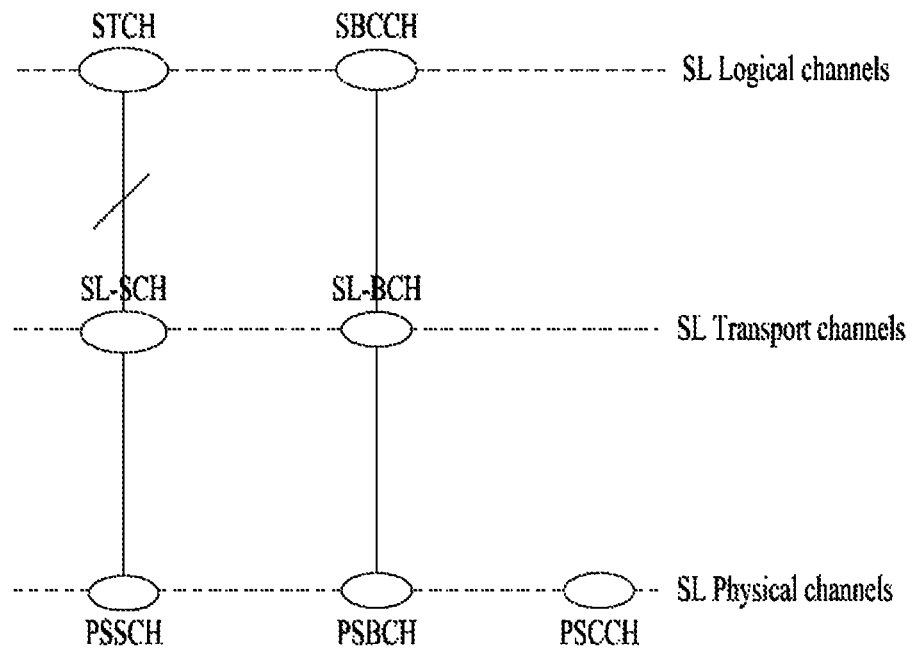
FIG. 10 is a diagram illustrating SL (side link) channels.

FIG. 10 is a diagram illustrating SL (side link) channels. The SL channels shown in FIG. 9 may correspond to channels for performing D2D communication (e.g., D2D communication of a narrow sense).

Referring to FIG. 10, STCH (SL traffic channel) and SBCCH (SL broadcast control channel) correspond to logical channels. The STCH transmits user data received from an application and is connected with SL-SCH (SL shared channel). The SL-SCH corresponding to a transport channel is connected with PSSCH (physical SL shared channel). The SL-SCH signals information necessary for performing synchronization in out-of-coverage or partial coverage scenario or information necessary for performing synchronization between UEs belonging to a different cell. The SBCCH is connected with SL-BCH corresponding to a transport channel. The SL-BCH is connected with PSBCH.

PSCCH (physical SL control channel) performs a role similar to a role of PDCCH in legacy communication performed between a UE and an eNB. The PSCCH is used to transmit SA (scheduling assignment). The SA can also be referred to as SCI (sidelink control information).

For clarity, a method for an eNB to directly designate a transmission resource of a D2D transmission UE is referred to as a mode 1. If a transmission resource region is configured in advance or an eNB designates the transmission resource region and a UE directly selects a transmission resource from the transmission resource region, it is referred to as a mode 2. In case of performing D2D discovery, if an eNB directly indicates a resource, it is referred to as a type 2. If a UE directly selects a transmission resource from a predetermined resource region or a resource region indicated by the eNB, it is referred to as a type 1.

For example, in the mode 1, an eNB designates a resource to be used for D2D communication in a resource pool. In the mode 2, a UE selects a resource pool from a set of allocated resource pools and may be able to directly select a D2D resource to be used from the selected resource pool. Hence, it is necessary for the UE to be in an RRC connected state in the mode 1. On the contrary, the UE may be in an RRC idle state or an out-of-coverage state in the mode 2.

Figure 11:
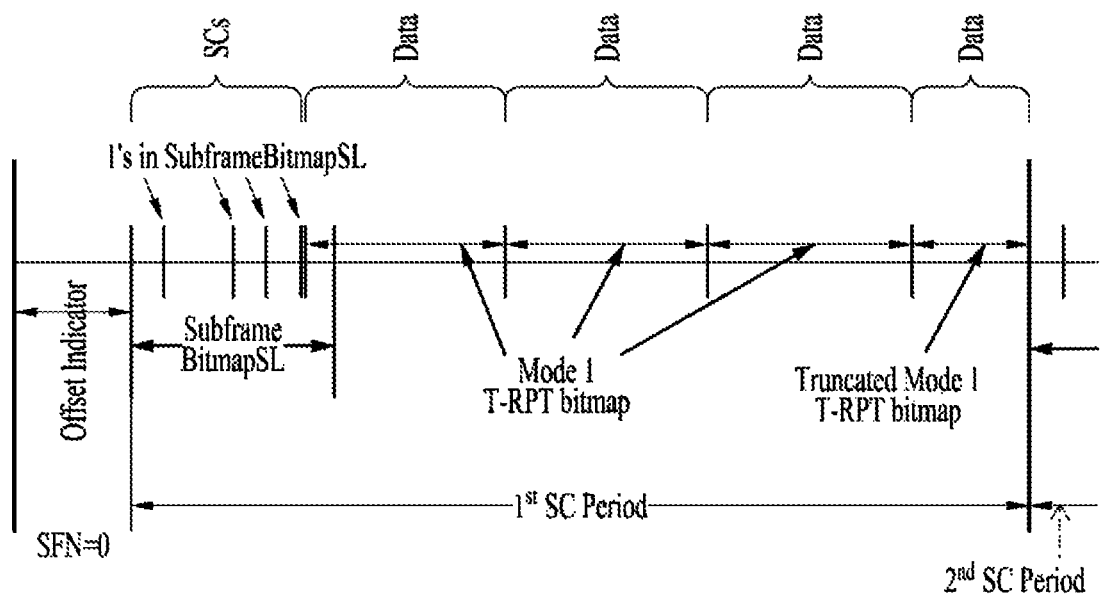
FIG. 11 is a diagram illustrating a D2D communication mode 1.

FIG. 11 is a diagram illustrating a D2D communication mode 1. According to a PSCCH/PSSCH structure for performing D2D communication, a set of subframes (i.e., a subframe bitmap) is divided into two regions (e.g., a control region and a data region). Whether or not a subframe is usable for D2D communication can be indicated via a subframe bitmap.

Referring to FIG. 11, an SC period (SL control period) starts from an offset of SFN=0 and can be periodically repeated. The SC period starts from a control region including SCI transmitted by PSCCH and 'SubframeBitmapSL' corresponding to a higher layer parameter indicates a subframe in which PSCCH is transmitted. A data region starts after the last bit configured by 1 in the 'SubframeBitmapSL'. The data region corresponds to a T-RPT bitmap corresponding to a different bitmap. The T-RPT bitmap indicates subframes in which data is transmitted. As shown in FIG. 11, a subframe pattern indicated by the T-RPT bitmap is repeated until the SC period ends. The last T-RPT bitmap is truncated according to the end of the SC-period. The T-RPT bitmap can be dynamically configured and can be differently configured according to each SC-period and each UE.

In most part, the mode 2 operates in a manner of being similar to the mode 1 shown in FIG. 11. Yet, there is a difference between the mode 1 and the mode 2 in that a start point of a data region is not determined based on SubframeBitmapSL in the mode 2. In the mode 2, the start point of the data region has a fixed offset from a start point of an SC period.

SFN Transmission of D2D Signal

In a wireless communication system, an SFN (single frequency network) corresponds to a technology that a plurality of transmitters transmit the same data in the same resource. When a receiver receives signals transmitted by the SFN scheme from a plurality of transmitters, the receiver can recognize each of the signals as a delayed signal delayed by multipath. Hence, the coverage of a signal can be increased. Since the same resource is used, efficiency of resource use can be enhanced.

In case of using a relay corresponding to a different technology capable of increasing the coverage, since the relay receives data from a source via a specific resource and transmits the data to a target UE(s) via a different resource, resource efficiency is lower than that of the SFN scheme. Time taken for transmitting the data is also longer than that of the SFN scheme. In particular, according to the SFN scheme, when a UE2 receives a signal from a UE1, if the UE1 repeatedly transmits the signal, the UE2 and the UE1 transmit the same signal in the same resource.

If a difference between arrival times of signals transmitted by transmitters is big (e.g., if the difference is longer than a CP length of LTE), the SFN should consider that signals belonging to the SFN may act as interference between the signals.

In the following, a method of transmitting a D2D signal (e.g., a D2d broadcast signal and/or a D2D multicast signal) using an SFN scheme is explained. And, information necessary for transmitting a D2D signal using the SFN scheme is defined. In the embodiments described in the following, 'D2D' may correspond to a concept including V2V (vehicle-to-vehicle), V2I (vehicle-to-infra), and V2P (vehicle-to-personal). For example, a device performing relaying using the SFN scheme can include at least one of a cellular UE, a D2D device mounted on a vehicle, an eNB, and an RSU (road side unit including a UE type), by which the present invention may be non-limited.

According to an SFN transmission method (e.g., MBSFN) defined in legacy LTE system, eNBs exchange transmission timing (e.g., MBSFN subframe), transmission data (e.g., MBMN data), and the like with each other via backhaul communication and transmit corresponding data at the same timing.

According to an SFN transmission method proposed in the embodiments of the present invention, if a D2D UE1 transmitting data requests to transmit the data using an SFN scheme, a D2D UE2(s), which have received the data, can transmit the data (together with data source information) at the timing indicated by the D2D UE1.

Information for SFN-Type D2D Communication

Information to be signaled or predefined to transmit a D2D signal using an SFN scheme is explained in the following. The information can be transmitted using a control signal (e.g., SA) defined in D2D or a control information delivering resource to be added later. If data is solely transmitted, the information can be transmitted in a manner of being included in the data. Information elements described in the following can be used for D2D transmission using the SFN scheme via a single information element or a combination of the information elements.

1. Whether to Use SFN or Priority

It may signal information on whether or not an SFN scheme is used to transmit a D2D signal and/or a priority of the D2D signal transmission. For example, the priority corresponds to a priority of a relayed data. As the priority is higher, it may indicate that it is necessary to preferentially relay the data.

For example, if a bump accident occurs on the highway, an accident vehicle can forward the accident to neighboring vehicles via a D2D signal. Since it is necessary to share the accident information over a wider range on the highway, a UE 1 may request to transmit the D2D signal using an SFN scheme via the D2D signal or SA for the D2D signal.

Having received the D2D signal or the SA for the D2D signal from the UE 1, a UE 2 determines whether to transmit the D2D signal in the same resource using the SFN scheme together with the UE 1. For example, if the UE 1 requests the UE 2 to transmit the D2D signal together or the received D2D signal has a top priority, the UE 2 can transmit the D2D signal together with the UE 1.

On the other hand, if SFN is not requested or the received signal has a priority lower than that of the SFN scheme, the UE 2 may relay the D2D signal using a general relaying scheme. Or, the UE may omit relaying itself. For example, in case that the UE 2 relays the D2D signal using a general relaying scheme, the UE 2 may relay the D2D signal in a resource (e.g., time/frequency) different from the timing at which the D2D signal is transmitted by the UE 1. Specifically, the UE 2 can relay the signal of the UE 1 in an SC period different from an SC period for which the signal of the UE 1 is transmitted. And, the UE 2 may relay the signal of the UE 1 using a resource pool different from a resource pool of the UE 1.

As a method for requesting transmission using an SFN scheme, for example, it may use explicit SFN request information, explicit priority information, or the like. Unlikely, it may use information on whether or not SFN is used, information on a priority, and the like depending on a resource in which a D2D signal is transmitted. For example, if a D2D signal requires SFN, it may be able to predefine/signal the D2D signal to be transmitted via a specific resource pool or use a different resource pool according to a priority. In particular, the UE 2 can determine whether to perform SFN transmission via explicit information (e.g., an SFN request or a priority) received from the UE 1. Or, the UE 2 can determine whether to perform SFN transmission via a resource pool used for receiving a signal.

Or, whether to perform SFN transmission can also be indicated via signal generation information, resource information, or the like. For example, in order to request transmission of a D2D signal using an SFN scheme, the UE 1 may configure a parameter for generating a signal by a specific value. Or, when a plurality of parameter sets are defined, it may assign a priority to each of a plurality of the parameter sets. The UE 2 can determine whether or not signal transmission using the SFN scheme is requested via a parameter used for receiving a signal from the UE 1. For example, if a specific parameter is used for receiving a D2D signal from the UE 1, the UE 2 and the UE 1 can transmit a signal together using the SFN scheme.

2. Signal Generation-Related Information

A UE 1 transmitting a D2D signal using an SFN scheme should transmit the same D2D signal (in every repetition). If a UE 2 succeeds in receiving the D2D signal using the SFN scheme, the UE 2 can generate the same D2D signal using a parameter used for receiving the D2D signal (in every repetition).

On the other hand, in order to avoid a collision between the D2D signal transmitted by the UE 1 and the D2D signal transmitted by the UE 2, a signal can be generated using a different parameter in every repetitive transmission. In this case, a parameter (e.g., a pattern) to be used for generating a signal can be signaled to the UE 2. For example, it may signal RS-related information (e.g., a cyclic shift value, an orthogonal cover code value, and base sequence information (hopping delta shift)), data-related information (e.g., scrambling information (cell ID, RNTI, slot number, and codeword index)) to be used in every repetition. The UE 2 generates a D2D signal via parameters and may be then able to transmit the D2D signal using the SFN scheme.

In order to clearly distinguish a D2D signal transmitted via the SFN scheme from a D2D signal transmitted via a non-SFN scheme, it may define a set of parameters for the SFN scheme. For example, the abovementioned parameters can be defined in advance by a specific value for the SFN scheme. In particular, configuration of a dedicated parameter set can be used as a method of requesting SFN or a method of determining a priority. For example, if the UE 2 receives a D2D signal via a parameter corresponding to a parameter dedicated to the SFN scheme or a parameter corresponding to the top priority, the UE 2 can transmit the D2D signal using the SFN scheme.

3. Resource Information

A device firstly performing transmission (and each transmission device) can forward information on a resource in which D2D data is transmitted. For clarity, assume that the device firstly performing transmission corresponds to a UE 1, a UE 2 receives a D2D signal from the UE 1, and the D2D signal is transmitted using an SFN scheme.

The information on the resource can include a repetition count of the D2D data and/or an interval between transmissions. In this case, repetition can be applied to the D2D data only or can be applied to the whole of SA+data.

For example, in D2D communication shown in FIG. 11, SA is transmitted and a D2D communication data corresponding to the SA is repeatedly transmitted. If the repetitive transmission is applied to the embodiments of the present invention, the repetition can be applied to repetitive transmission of D2D communication data only. In this case, an SA period (or, an SC period) including the SA and the repetition of the communication data can be defined to be larger than a legacy period. A repetition count and an interval between transmissions can also be configured to be larger than those of legacy D2D. If an interval between data repetition transmissions, which are transmitted after the SA, is wide, the UE 2 decodes the D2D data and can transmit data identical to data of the UE 1 to a resource in which the data of the UE 1 is transmitted using the SFN scheme in a next repetition.

If it is necessary to perform SFN on D2D data received by the UE 2, the UE 2 may transmit SA for scheduling a next transmission prior to the next transmission of the D2D data. In this case, the SA can be transmitted by UEs/relays transmitting data using the SFN scheme using the SFN scheme.

As a different scheme, repetition can be performed in a unit of SA+data. In this case, the UE 2 performs decoding on firstly transmitted SA+data among repetitive transmissions and can transmit data identical to data of the UE 1 to the same resource in a next SA+data repetitive transmission using the SFN scheme.

Whenever data (or, SA+data) is repeatedly transmitted, if a resource is differently configured (e.g., resource hopping) for the transmission, it may be able to signal a hopping pattern for a resource configuration as well.

It may also be able to forward information on an RV (redundancy version) combination to make the UE use the information in repeatedly transmitting the same data using the SFN scheme. If D2D transmission is performed using the SFN scheme, it may fix an RV.

Figure 12:
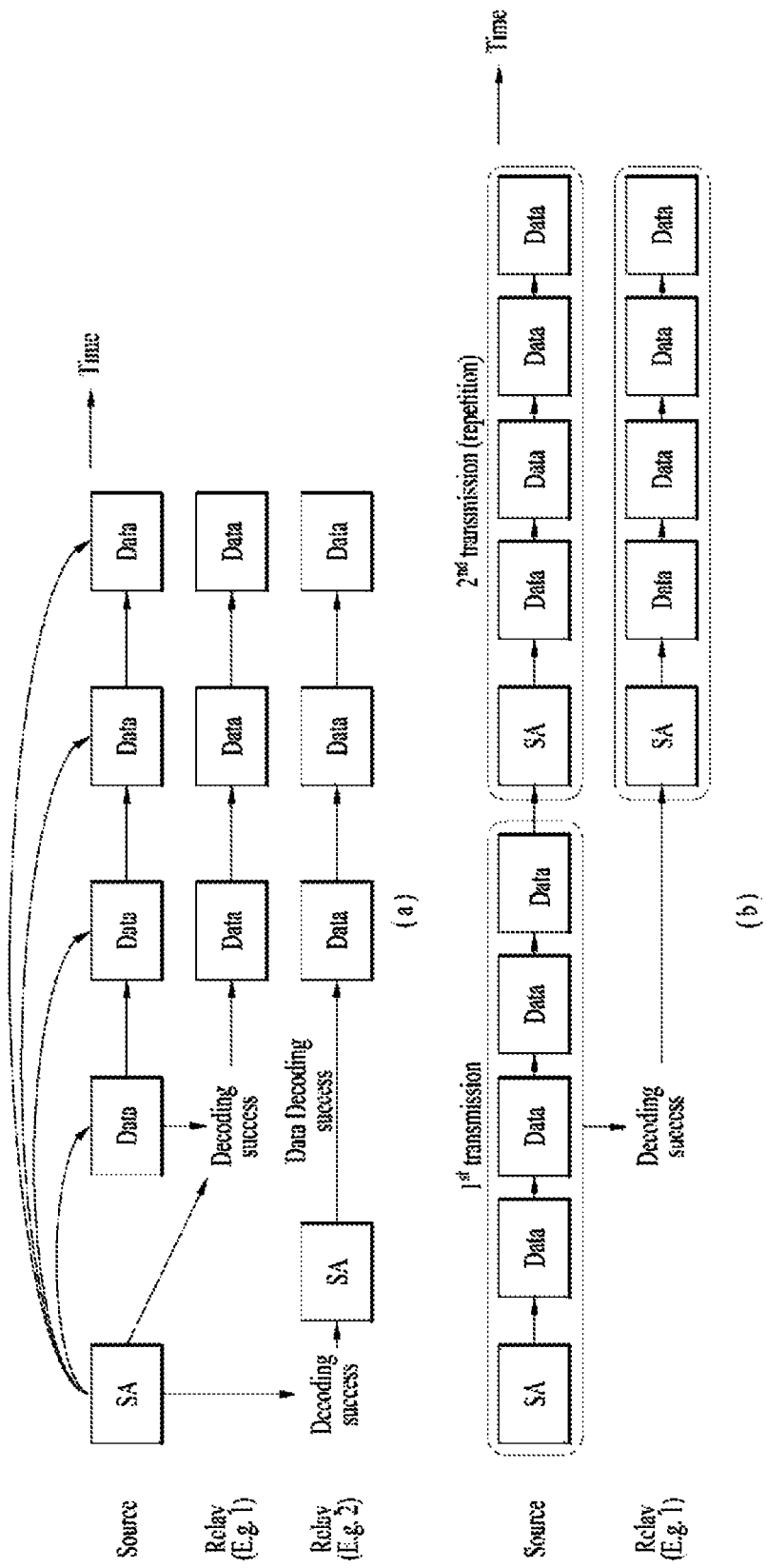
FIGS. 12 and 13 are diagrams illustrating a method of transmitting a D2D signal using an SFN scheme according to one embodiment of the present invention.

FIG. 12 is a diagram illustrating a method of transmitting a D2D signal using an SFN scheme according to one embodiment of the present invention. FIG. 12 (a) shows an example of SFN transmission for SA and/or data. For example, according to an example 1, a relay UE can transmit not only data but also SA+data using the SFN scheme. The relay UE decodes the SA and the data received from a source UE. Subsequently, when the source UE transmits data in a next repetition, the relay UE can transmit data identical to the data of the source UE.

Meanwhile, when the relay UE transmits SA (example 2), the relay UE transmits the SA using the SFN scheme and the relay UE can perform SFN transmission of data from the timing at which the relay UE and the source UE are able to transmit data together.

When (SA+data) period is repeated, FIG. 12 (b) illustrates that decoding is performed in a first (SA+data) period and transmission is performed using the SFN scheme in a next (SA+data) period.

4. Hop Count Information

As mentioned in the foregoing description, the SFN scheme can efficiently widen coverage and reduce transmission latency. On the other hand, if signals transmitted from a plurality of transmitters are more widely distributed compared to a CP length, interference may increase. In a legacy LIE system, in case of MBSFN, since a location of an eNB is fixed, a timing difference between eNBs can be configured within a prescribed range (e.g., a CP length). On the contrary, in case of D2D UEs, it is difficult to guarantee a timing difference between signals within a prescribed range due to the mobility of the UEs.

In order to reduce the demerit above, if a distance from a source is equal to or greater than a prescribed level, it is necessary to restrict the SFN scheme based transmission.

To this end, one embodiment of the present invention proposes that hop count information is to be signaled. For example, each UE performing SFN transmission can transmit a hop count-related parameter of control information received by the UE by increasing the parameter by 1.

Or, as a simple method, it may use a flag. For example, a UE 1 corresponding to a source UE transmits a hop flag by configuring the hop flag by 0 and a UE 2 performing relaying using the SFN scheme transmits the flag by configuring the flag by 1. If the flag corresponds to 1, a UE 3, which have received a D2D signal from the UE 2 using the SFN scheme and decoded the D2D signal, may not perform an additional relaying operation.

Additionally, a maximum hop count can be defined in advance or can be forwarded together with a hop count. If a UE performing relaying receives a signal and a hop count of the signal corresponds to a maximum hop count, the UE may not transmit (e.g., relay) the signal while receiving the signal.

If synchronization (e.g., time/frequency synchronization) is performed between D2D devices via global timing (e.g., GPS), information on signal transmission timing of a source and a permitted maximum timing difference can be forwarded. The source may correspond to a device that firstly transmits the signal. Meanwhile, transmission timing of each transmission device can be additionally signaled together with the information.

If (i) a difference between the transmission timing of the source and transmission timing of a specific transmission device is close to (ii) a permitted maximum timing difference (if a difference between (i) and (ii) is equal to or less than a prescribed size), a reception device may receive the signal only without transmitting the signal using the SFN scheme. If a plurality of transmission devices exist, the reception device is able to calculate the (i) on the basis of a transmission device of which measured signal power is the greatest.

Meanwhile, in case of using a GPS, a source may forward location information via the GPS. Relay devices performing SFN can also forward GPS location information of the source via the SFN scheme. If a distance between the source and a reception device is equal to or greater than a prescribed distance, the reception device may not participate in transmission using the SFN. The prescribed distance can be defined in advance or can be forwarded together with GPS information.

Figure 13:
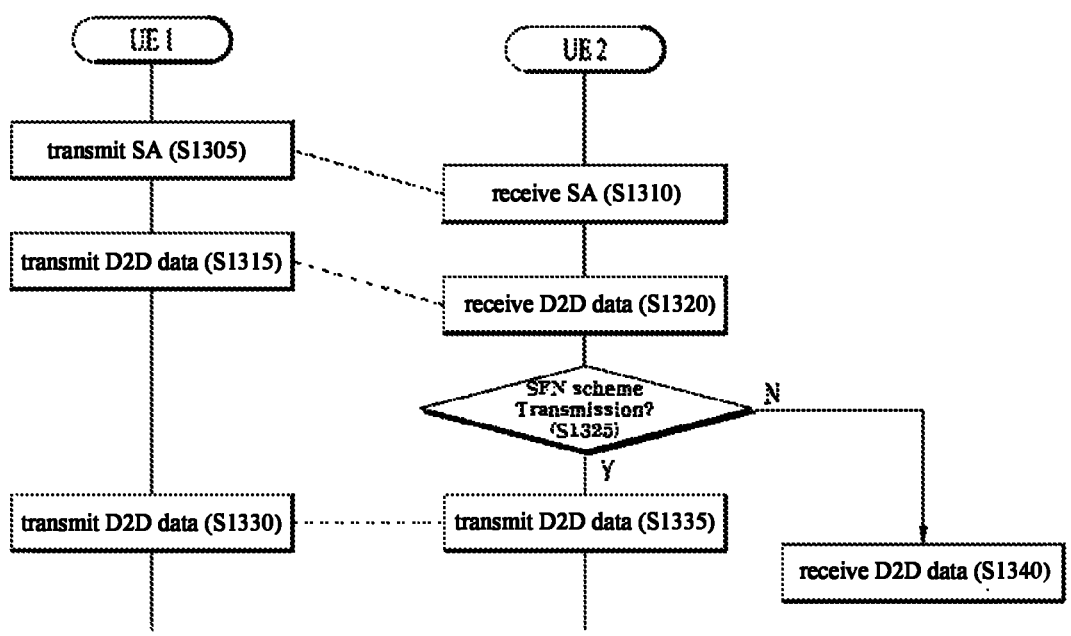

FIG. 13 is a flowchart illustrating a method of transmitting a D2D signal using an SFN scheme according to one embodiment of the present invention. Explanation on contents overlapped with the aforementioned contents is omitted at this time.

Referring to FIG. 13, a UE 1 transmits SA (scheduling assignment) information for scheduling D2D data to a UE 2 [S1305].

The UE 1 transmits the D2D data to the UE 2 according to the SA information [S1315, S1320].

The D2D data can be repeatedly transmitted by the UE 1 [S1330]. The UE 1 may request the UE 2 to perform repetitive transmission of the D2D data together with the UE 1 on the same time-frequency resource.

For example, the UE 1 may request the UE 2 to perform transmission using an SFN scheme by including an SFN request in the SA information or setting a priority to the D2D data. As a different example, the UE 1 may request the UE 2 to perform transmission using the SFN scheme by transmitting the D2D data via a resource configured for the SFN among a plurality of D2D resources. As a further different example, the UE 1 may request the UE 2 to perform transmission using the SFN scheme by using a specific parameter indicating the SFN in generating a signal of the D2D data. Specifically, the specific parameter indicating the SFN can include at least one of a cyclic shift value of a reference signal, an orthogonal cover code value of the reference signal, base sequence information of the reference signal, and data scrambling information.

The SA information can include information for restricting the SFN scheme based transmission when a distance from the UE 1 is equal to or greater than a prescribed distance. For example, the information for restricting the SFN scheme based transmission can include at least one of hop count information, information on transmission timing of the UE 1, and location information of the UE 1.

Meanwhile, the UE 2 can decode the D2D data based on the SA information.

The UE 2 can determine whether or not the D2D data is transmitted using the SFN scheme [S1325]. For example, if the UE 1 requests the UE 2 to perform SFN scheme based transmission, the UE 2 can repeatedly transmit the D2D data together with the UE 1 on the same time-frequency resource [S1335].

For example, the UE 2 can determine whether to perform the SFN scheme based transmission based on the SFN request included in the SA information or a priority set to the D2D data.

As a different example, the UE 2 can determine whether to perform the SFN scheme based transmission based on whether or not the D2D data is received via a resource configured for the SFN among a plurality of D2D resources. As a further different example, the UE 2 can determine whether to perform the SFN scheme based transmission based on whether or not a specific parameter indicating the SFN is used for performing decoding on the D2D data.

Meanwhile, when a distance between the UE and the UE 1 is equal to or greater than a prescribed distance, the UE 2 may not perform the SFN scheme based transmission. For example, the distance from the UE 1 can be estimated using at least one of hop count information, information on transmission timing of the UE 1, and location information of the UE 1.

Figure 14:
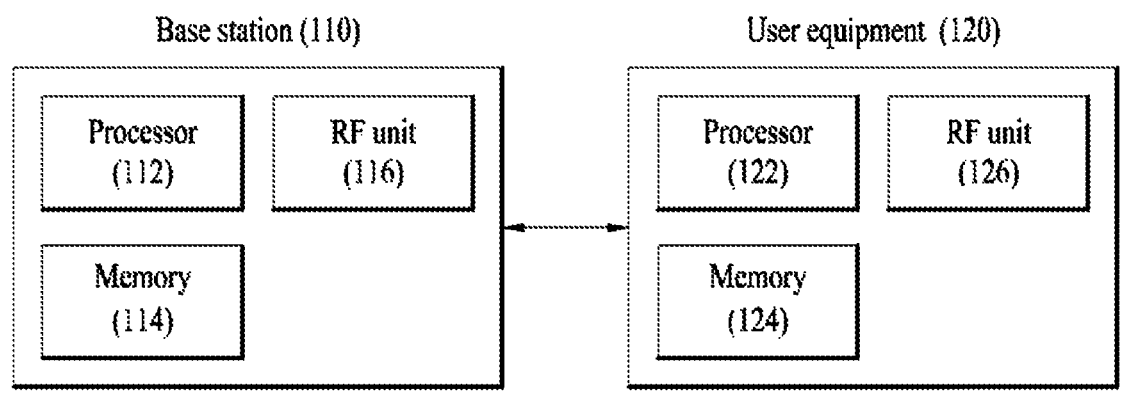
FIG. 14 is a view illustrating a user equipment (UE) and a base station (BS) according to an embodiment of the present invention.

FIG. 14 is a view illustrating a user equipment (UE) and a base station (BS) according to an embodiment of the present invention.

Referring to FIG. 14, a wireless communication system includes a BS 110 and a UE 120. In downlink, a transmitter may be a part of the BS 110, and a receiver may be a part of the UE 120. In uplink, a transmitter may be a part of the UE 120, and a receiver may be a part of the BS 110. The BS 110 includes a processor 112, a memory 114, and a Radio Frequency (RF) unit 116. The processor 112 may be configured so as to implement the procedures and/or methods proposed in the present invention. The memory 114 is connected to the processor 112 and stores various pieces of information related to operations of the processor 112. The RF unit 116 is connected to the processor 112 and transmits and/or receives RF signals. The UE 120 includes a processor 122, a memory 124, and an RF unit 126. The processor 122 may be configured so as to implement the procedures and/or methods proposed in the present invention. The memory 124 is connected to the processor 122 and stores various pieces of information related to operations of the processor 122. The RF unit 126 is connected to the processor 122 and transmits and/or receives RF signals. The BS 110 and/or the UE 120 may have a single antenna or multiple antennas.

It will be appreciated by persons skilled in the art that the objects that can be achieved by the present invention are not limited to what has been particularly described hereinabove and the above and other objects that the present invention can achieve will be more clearly understood from the foregoing detailed description taken in conjunction with the accompanying drawings. The exemplary embodiments described hereinabove are combinations of elements and features of the present invention. The elements or features may be considered selective unless otherwise mentioned. Each element or feature may be practiced without being combined with other elements or features. Further, the embodiments of the present invention may be constructed by combining parts of the elements and/or features. Operation orders described in the embodiments of the present invention may be rearranged. Some constructions or characteristics of any one embodiment may be included in another embodiment and may be replaced with corresponding constructions or characteristics of another embodiment. It is apparent that the present invention may be embodied by a combination of claims which do not have an explicitly cited relation in the appended claims or may include new claims by amendment after application.

In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', etc.

The above-described embodiments of the present invention can be implemented by a variety of means, for example, hardware, firmware, software, or a combination thereof. In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory to be driven by a processor. The memory may be located inside or outside of the processor, so that it can communicate with the aforementioned processor via a variety of well-known parts.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The embodiments of the present invention as described above are applicable to various wireless communication systems such as the 3GPP wireless communication system.

What is claimed is:

1. A method of transmitting a device-to-device (D2D) signal by a first D2D user equipment (UE) supporting D2D communication, the method comprising:
   transmitting scheduling assignment (SA) information for scheduling D2D data to a second D2D UE; and
   transmitting the D2D data to the second D2D UE based on the SA information,
   wherein when a parameter set used for generating the D2D signal by the first UE is equal to a predetermined value set, the D2D signal is transmitted based on a single frequency network (SFN) scheme by the second D2D UE,
   wherein the parameter set used for generating the D2D signal by the first UE and the parameter set used for generating the D2D signal by the second UE comprise at least one of a cyclic shift value of a reference signal, an orthogonal cover code value of the reference signal, base sequence information of the reference signal, and data scrambling information,
   wherein when the first UE and the second UE transmit the D2D signal in a same resource based on the SFN scheme, a parameter set used for generating the D2D signal by the second UE is different from the predetermined value set, and
   wherein the SA information comprises information for restricting the second D2D UE from transmitting the D2D signal based on the SFN scheme when a distance from the first D2D UE is equal to or greater than a preset distance.

2. The method of claim 1, wherein the information for restricting the SFN scheme based transmission comprises at least one of hop count information, information on transmission timing of the first D2D UE, and location information of the first D2D UE.

3. A method of receiving a device-to-device (D2D) signal from a first D2D user equipment (UE) by a second D2D UE supporting D2D communication, the method comprising:

receiving scheduling assignment (SA) information and D2D data scheduled based on the SA information from the first D2D UE; and decoding the D2D data based on the SA information, wherein when a parameter set used for generating the D2D signal by the first UE is equal to a predetermined value set, the D2D signal is transmitted based on a single frequency network (SFN) scheme by the second D2D UE, wherein the parameter set used for generating the D2D signal by the first UE and the parameter set used for generating the D2D signal by the second UE comprise at least one of a cyclic shift value of a reference signal, an orthogonal cover code value of the reference signal, base sequence information of the reference signal, and data scrambling information, wherein when the first UE and the second UE transmit the D2D signal in a same resource based on the SFN scheme, a parameter set used for generating the D2D signal by the second UE is different from the predetermined value set, and wherein the SA information comprises information for restricting the second D2D UE from transmitting the D2D signal based on the SFN scheme when a distance from the first D2D UE is equal to or greater than a preset distance.

4. The method of claim 3, wherein the distance from the first D2D UE is estimated using at least one of hop count information, information on transmission timing of the first D2D UE, and location information of the first D2D UE.

5. A D2D (device-to-device) user equipment (UE) supporting D2D communication, comprising:

a transmitter; and a processor configured to control the transmitter to transmit scheduling assignment (SA) information for scheduling D2D data to a different D2D UE, and to transmit the D2D data to the different D2D UE based on the SA information, wherein when a parameter set used for generating the D2D signal by the first UE is equal to a predetermined value set, the D2D signal is transmitted based on a single frequency network (SFN) scheme by the second D2D UE, wherein the parameter set used for generating the D2D signal by the first UE and the parameter set used for generating the D2D signal by the second UE comprise at least one of a cyclic shift value of a reference signal, an orthogonal cover code value of the reference signal, base sequence information of the reference signal, and data scrambling information, wherein when the first UE and the second UE transmit the D2D signal in a same resource based on the SFN scheme, a parameter set used for generating the D2D signal by the second UE is different from the predetermined value set, and wherein the SA information comprises information for restricting the different D2D UE from transmitting the D2D signal based on the SFN scheme when a distance from the D2D UE is equal to or greater than a preset distance.

* * * * *